United States Patent
Lowe

(10) Patent No.: US 7,123,696 B2
(45) Date of Patent: Oct. 17, 2006

(54) METHOD AND APPARATUS FOR GENERATING AND DISTRIBUTING PERSONALIZED MEDIA CLIPS

(76) Inventor: Frederick Lowe, 15490 Ventura Blvd., Suite 220, Los Angeles, CA (US) 91403

( * ) Notice: Subject to any disclaimer, the term of this patent is extended or adjusted under 35 U.S.C. 154(b) by 257 days.

(21) Appl. No.: 10/605,527

(22) Filed: Oct. 6, 2003

(65) Prior Publication Data

US 2004/0107169 A1    Jun. 3, 2004

Related U.S. Application Data

(60) Provisional application No. 60/416,127, filed on Oct. 4, 2002.

(51) Int. Cl.
*H04M 1/64* (2006.01)
*G06F 15/16* (2006.01)

(52) U.S. Cl. ............... 379/88.16; 379/68; 709/231

(58) Field of Classification Search ............ 379/67.1, 379/88.13, 88.16, 88.19, 88.22, 373.02; 705/59; 707/9; 713/202; 709/231
See application file for complete search history.

(56) References Cited

U.S. PATENT DOCUMENTS

| | | | |
|---|---|---|---|
| 6,137,834 A * | 10/2000 | Wine et al. ............ | 375/240 |
| 6,388,560 B1 * | 5/2002 | Parvulescu et al. ...... | 379/93.03 |
| 2002/0138302 A1 * | 9/2002 | Bodnick ................... | 379/90.01 |
| 2002/0147645 A1 * | 10/2002 | Alao et al. .................... | 705/14 |
| 2004/0125925 A1 * | 7/2004 | Marsot ..................... | 379/88.22 |
| 2005/0102244 A1 * | 5/2005 | Dickinson et al. ............ | 705/74 |

* cited by examiner

*Primary Examiner*—Ovidio Escalante
(74) *Attorney, Agent, or Firm*—Dalina Law Group PC.

(57) ABSTRACT

The invention has many different applications and implementations. One or more embodiments of the invention, however, are directed to a software program and/or computer hardware configured to enable users to select one or more master clips having predefined gaps, obtain insert data (e.g., an insert clip), seamlessly merge the insert data into the selected master clip to generate a media clip, and distribute the media clip having the insert data to one or more receiving users for playback. The method of distribution can vary, but in one or more embodiments of the invention the system is configured to obtain user information from a server, assemble personalized media clips (e.g., file(s)) based on that user information, and distribute the personalized media file to one or more users associated with that user information. Embodiments of the invention may utilize scaleable architectures to process any number of users and/or recipients.

68 Claims, 10 Drawing Sheets

METHOD AND APPARATUS FOR
GENERATING AND DISTRIBUTING
PERSONALIZED MEDIA CLIPS

This application takes priority from U.S. Provisional Application Ser. No. 60/416,127 filed Oct. 4, 2002 entitled "METHOD AND APPARATUS FOR GENERATING AND DISTRIBUTING PERSONALIZED MEDIA CLIPS" which is hereby incorporated by reference.

BACKGROUND OF INVENTION

1. Field of the Invention

One or more embodiments of the invention have applicability in the fields of computer software, hardware, and network communication technologies. More particularly, the invention is directed to a method and apparatus for generating and distributing sets of personalized media clips.

2. Background

Modern systems generate and utilize multimedia data in a plurality of different ways. For example, users can currently communicate information to and hear responses from systems that generate audio data and transmit that data back to the user over the telephone. Typically, existing systems utilize a mapping between one form of data (e.g. numerical information or text data) and a set of audio files to generate an audio file for playback. One common scenario where this occurs is when calling a bank to check bank account balances or transfer money. The system at the bank may, for example, obtain a user's account information via touchtone input and audibly playback that users account information for purposes of confirmation. Existing systems for building and distributing such audio files use the input to map to a set of prerecorded audio tracks and assemble a message for playback. The end result is often times an awkward sounding message that fails to seamlessly integrate the prerecorded audio tracks.

Existing solutions do not provide a way to generate an audio file that seamlessly integrates a plurality of audio files in a way that makes the generated file sound like an original recording with undetectable transitions, rather than a computer generated message. Moreover, current systems do not personalize the content of the generated audio file based on user information automatically obtained from the device or software program utilized to access the system and/or context information associated with the user. For instance, current systems do not provide a mechanism for automatically generating and disseminating a personalized audio file to a user viewing a web page. As a result of these limitation and others there is a need for an improved system for generating and dispatching personalized media clips.

Another problem with current systems is that such systems do not have an integrated mechanism for generating and distributing sets of one or more personalized audio files to a plurality of recipients. For instance, existing system lack a mechanism for utilizing databases of information to generate a personalized media file and then distribute that personalized media to one or more appropriate users via electronic mail or some other distribution means. Current systems, for example, do not allow for seamlessly integrated personalized media messages to be sent to customers such as an audio clip with the following content: "[title][user surname], your account requires a payment of [deficit amount], where [title] is Mr./Mrs./Ms./Dr., [user surname] is the customers last name and [deficit amount] is the payment required.

SUMMARY OF INVENTION

The invention has many different applications and implementations. One or more embodiments of the invention, however, are directed to a software program and/or computer hardware configured to enable users to select one or more master clips having predefined gaps, obtain insert data (e.g., an insert clip), seamlessly merge the insert data into the selected master clip to generate a media clip with undetectable transitions between spliced clips, and distribute the media clip having the insert data to one or more receiving users for playback. The method of distribution can vary, but in one or more embodiments of the invention the system is configured to obtain user information from a server, assemble personalized media into personalized media clips (e.g., file(s)) based on that user information, and distribute the personalized media file to one or more users associated with that user information. Embodiments of the invention may utilize any computing environment from single processor computing systems to highly optimized multi-threaded server processes comprising seamless splicing of compressed media or any combination thereof in order to maximize the number of connections achieved and/or processing throughput per server.

An insert clip may contain any type of data. In most instances, however, the insert clip is utilized for purposes of adding variables such as a name, place, time, gender, product name or any other desirable information to a master clip. The integration between the master clip and the insert clip is seamless. Regardless of the size of the insert clip the finished media clip lacks any noticeable gaps or intonation changes. Even though the media clip is generated using a plurality of different clips, the media clip sounds as if it was originally recorded as it is heard. Flash animation or other types of multimedia data such as video can be added to the media clip to enhance the user experience during playback.

Although the contents of the master clip and/or the insert clip may use any voice, on many occasions celebrity voices or the voices of celebrity impersonators are utilized. The master clip, for instance, might be recorded by the celebrity and the insert clip recorded using a voice over artist. Thus, embodiments of the invention provide a mechanism for generating and distributing personalized media clips using what sounds like and/or is the voice of a celebrity. For instance, once the system merges one or more master clips together with one or more insert clips and thereby generates the media clip, the system can provide the media clip to a device and/or program for playback.

Playback of the media clip initiates at a number of different types of devices and can be triggered by a multitude of different events. Some examples of the types of playback devices (also known herein as destination clients) used in accordance with one or more embodiments of the invention, include (but are not limited to) a computational device configured to access a network (e.g., the World Wide Web (WWW)) via a browser, an email client, or some other network interface. A cell phone or any other type of portable or non-portable device (satellite, digital cable, and/or satellite radio) configured to output media clips (e.g., audio, video, etc . . . ) may also function as a playback device.

An embodiment of the invention allows for an RFID based device, such as SpeedPass® to provide a unique identification to a RFID reader which in turn provides for a personalized message to be played back by a gas pump electronic interface unit, which in this case would be the playback device.

Another playback device may be a credit card reader configured to play back a personalized message to a shopper after the user identifies themselves with the credit card. For example, media output in this case may include a Flash animation with the user's name and an audio track with the phrase, "Welcome [user name], your current purchase is missing your [time period] buy of [product name]", where [user name], [time period] and [product name] are insert clips that seamlessly combine with the master clip to create the output media clip.

Another embodiment of the invention enables a playback device such as a kiosk for purchasing plane tickets or groceries to identify and play personalized media messages to a user. Additional examples of playback devices used in embodiments of the invention include loyalty card readers, ATM machines, GPS devices in planes and cars. Hotel electronic doors are another example playback device where the insertion of an electronic key into the guest's door plays a message such as "Welcome [title] [user surname]" with title and user surname set to "Ms." and "Smith" respectively in this example.

Another example playback device may be a slot machine capable of identifying the user via credit card, RFID or hotel room key. The slot machine could play a message such as "[User name], you just won [winning amount] dollars!".

Another example playback device may be a public phone whereby a phone card encodes the personalized information or identifies the user and the phone plays operator messages comprise a customer name. An example message may be "[user first name], please insert 40 cents more for the next 3 minutes" where user first name could be "Sylvia".

Another example playback device may be a toy which may be personalized at the factory at on-line purchase time or at home through a network connection or through a wireless interface to a local computer with a network connection or configured to run as an embodiment of the invention.

In at least one embodiment of the invention, the time at which playback initiates depends upon the context of the device. Displaying a certain website, reading a particular email, calling a particular person, or being in a certain location are some of the examples of the different contexts that might trigger playback. These non-personal events or values may cause branching in determining an alternate clip, or clips (insert or context or master) to splice together for final playback. For instance, a user of the system might initiate playback by visiting a certain web page (or some other type of online document or program) where the users will hear a personalized greeting from a celebrity. If, for example, the user visits an online bookstore, that user might receive a personal greeting from one of the user's favorite authors who then proceeds to promote his newest novel. If the context information associated with the time of day for example would indicate that a different master clip should be played, i.e., shorter clips from the author in the morning than at night, then embodiments of the invention may take branching actions based on this context information. Other examples include personalized messages via email, a cell phone or some other playback device. In addition, a timer function or calendar function may initiate a media clip transmission. Another example context function producing a asynchronous initiation of a media clip without user intervention may include a location context whereby a GPS receiver in a phone or car initiates a media message based on location. Any non-personalized information or information source may be used as a context source.

If the media clip is distributed via the WWW, the media clip may be generated and automatically transmitted when the user visits a particular web page. The invention contemplates the use of a variety of different techniques for dynamically generating media clips. In one embodiment, the system obtains user information from a cookie file to instantaneously render a personalized multimedia file. In other instances user data is already known by the system or obtained and confirmed via a log-in process.

If the media clip is to be distributed via electronic mail, cellular telephone, or some other telecommunication mechanism, embodiments of the invention may utilize a database of user information to assemble the media clip. A content provider that wishes to distribute a media clip (e.g., a personalized advertisement or some other personalized media clip) could provide a request to the system for processing. The system utilizes the request, which identifies or contains at least one master clip to be readied for playback and contains type information associated with each of the locations where insert clips are to be merged into the master clip. The type information is then utilized to obtain user information from a system database and the user information is in turn used to obtain relevant insert clips for purposes of generating a media file. Once the insert clips are obtained the system merges them together with the master clip and distributes the completed media clip to the user via email or some other distribution means.

DETAILED DESCRIPTION

Figure 1:
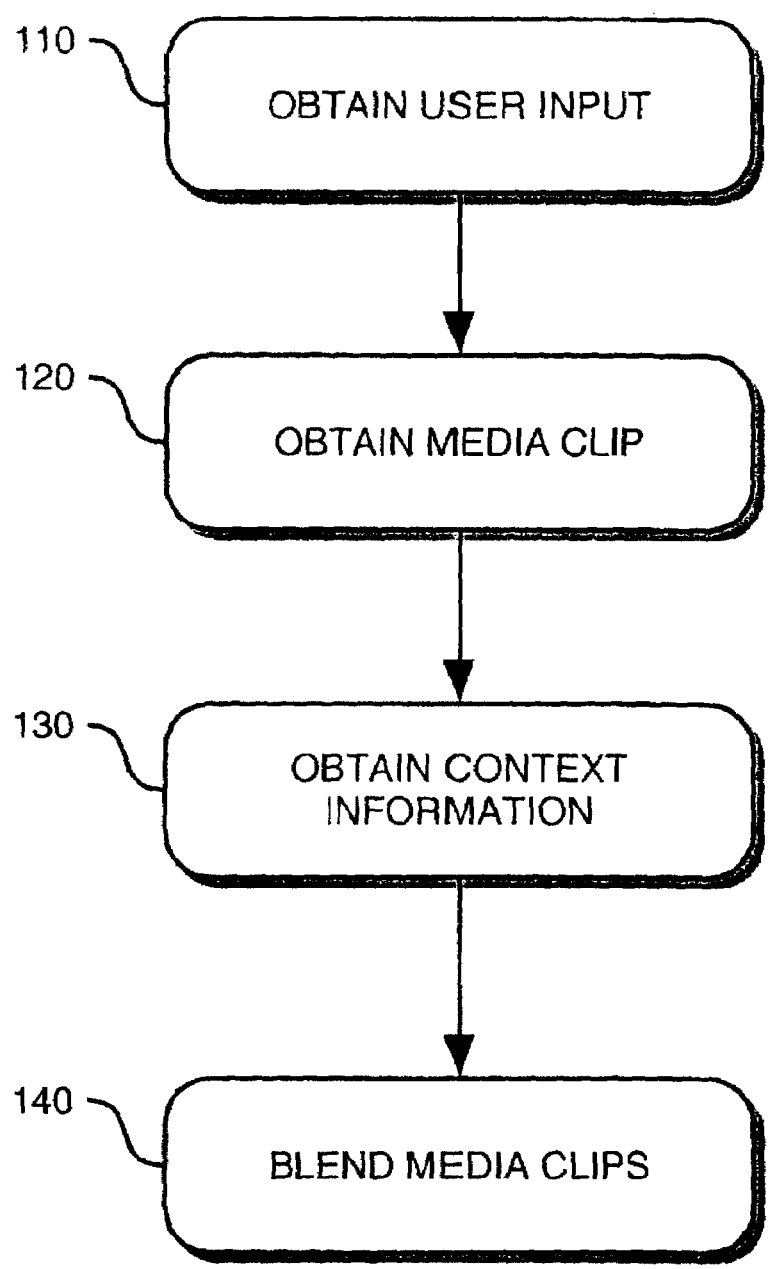
FIG. 1 illustrates the process for generating and dispatching personalized media clips in accordance with one or more embodiments of the invention.

Embodiments of the invention relate to a method and apparatus for generating and distributing personalized media clips to a plurality of users. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

System Overview The invention has many different applications and implementations. One or more embodiments of the invention, however, are directed to a software program and/or computer hardware configured to enable users to select one or more master clips having predefined gaps, obtain insert data (e.g., an insert clip), seamlessly merge the insert data into the selected master clip to generate a media clip with undetectable transitions between spliced clips, and distribute the media clip having the insert data to one or more receiving users for playback. The method of distribution can vary, but in one or more embodiments of the invention the system is configured to obtain user information from a server, assemble personalized media clips (e.g., file(s)) based on that user information, and distribute the personalized media file to one or more users associated with that user information. Embodiments of the invention may utilize any computing environment from single processor computing systems to highly optimized multi-threaded server processes comprising seamless splicing of compressed media or any combination thereof in order to maximize the number of connections achieved and/or processing throughput per server.

An insert clip may contain any type of data. In most instances, however, the insert clip is utilized for purposes of adding variables such as a name, place, time, gender, product name or any other desirable information to a master clip. By maintaining small personalized clips for all requested variable values separate from a master clip, an output clip may be created dynamically. This allows far less memory to be utilized compared to a brute force method involving creating and maintaining large numbers of lengthy output clips in memory. The integration between the master clip and the insert clip is seamless. Regardless of the size of the insert clip the finished media clip lack any noticeable gaps or intonation changes. Even though the media clip is generated using a plurality of different clips, the media clip sounds as if it was originally recorded as it is heard. Flash animation or other types of multimedia data can be added to the media clip to enhance the user experience during playback. Great processing optimizations may be utilized in embodiments of the invention that employ seamless splicing of compressed media formats without the need to algorithmically compress the entire message after integration of insert clips. Embodiments of the invention may bypass use of compression proxies altogether using seamless splicing of compressed media.

Although the contents of the master clip and/or the insert clip may use any voice, on many occasions celebrity voices or the voices of celebrity impersonators are utilized. The master clip, for instance, might be recorded by the celebrity and the insert clip recorded using a voice over artist. Thus, embodiments of the invention provide a mechanism for generating and distributing personalized media clips using what sounds like and/or is the voice of a celebrity. For instance, once the system merges one or more master clips together with one or more insert clips and thereby generates the media clip, the system can provide the media clip to a device and/or program for playback. Embodiments of the invention may use computer synthesized and/or TTS (text to speech) software of varying complexity in order to simulate voices.

Playback of the media clip initiates at a number of different types of devices and can be triggered by a multitude of different events. Some examples of the types of playback devices used in accordance with one or more embodiments of the invention, include (but are not limited to) a computational device configured to access a network (e.g., the World Wide Web (WWW)) via a browser, an email client, or some other network interface. A cell phone or any other type of portable or non-portable device (satellite, digital cable, and/or satellite radio) configured to output media clips (e.g., audio, video, etc . . . ) may also function as a playback device. Embodiments of the invention may use personalized ring clips (also known herein as personalized ring media clips) when certain incoming phone numbers are dialing the user's phone. An example media or ring clip could utilize a celebrity voice to announce "[user name] your [relative type] is calling", where [user name] is the user's name spoken in the voice of a celebrity and [relative type] is selected from the list of {brother, mother, father, son, etc.}. In this embodiment, the cell gateway itself may digitally determine the incoming phone number and create the resulting message if the user for example does not pick up the phone, in which case the message is left in the user's voice mail, or the cell phone itself may have the master clip and personalized variables and construct the media clip using a local processor on the phone itself.

An embodiment of the invention allows for an RFID based device, such as SpeedPass® to provide a unique identification to a RFID reader which in turn provides for a personalized message to be played back by a gas pump electronic interface unit, which in this case would be the playback device. In this embodiment of the invention, the gas station local server, or company main server may contain the personalized variable information. When the unique identification is presented to either server, the resulting output media clip may be constructed on either server and played on the gas pump electronic interface unit. Bluetooth devices in the vehicle or coupled with the user may also play back the output media clip if the gas pump electronic interface unit is configured with WiFi or other wireless technologies configured to request media output.

Another playback device may be a credit card reader configued to play back a personalized message to a shopper after the user identifies themselves with the credit card. For example, media output in this case may include a Flash animation with the user's name and an audio track with the phrase, "Welcome [user name], your current purchase is missing your [time period] buy of [product name]", where [user name], [time period] and [product name] are insert clips that seamlessly combine with the master clip to create the output media clip. In this embodiment of the invention the credit card reader forwards the credit request to the store's server. The server identifies the user and constructs the media clip which is sent back to the card reader and played.

Another embodiment of the invention enables a playback device such as a kiosk for purchasing plane tickets or groceries to identify and play personalized media messages to a user. Additional examples of playback devices used in embodiments of the invention include loyalty card readers, ATM machines, GPS devices in planes and cars. Hotel electronic doors are another example playback device where the insertion of an electronic key into the guest's door plays a message such as "Welcome [title][user surname]" with title and user surname set to "Ms." and "Smith" respectively in this example. Playback devices may connect to embodiments of the invention comprising computational resources or if the playback device itself has enough computational power and storage comprising personalized information or can obtain the personalized information from an identifier associated with the user, may act as an embodiment of the invention in terms of constructing and playing the personalized media clip. In this example, the hotel electronic door may comprise a network connection to the hotel's computing system. This connection may be wireless or wired. The hotel computing system in this example may detect the electronic key or credit card-like magnetic key and determine the identification of the hotel guest. The personalized message comprising the "Welcome [title] [user surname]" media clip would then be generated on the hotel's computing system, sent to the electronic door and played on small speaker constructed into the electronic door.

Another example playback device may be a slot machine capable of identifying the user via credit card, RFID or hotel room key. The slot machine could play a message such as "[User name], you just won [winning amount] dollars!". In this example, the slot machine may be networked to a server comprising the computational power and requisite personalization clips to create the output media clip or the slot machine itself may obtain an identifier associated with the user and construct the media clip itself.

Another example playback device may be a public phone whereby a phone card encodes the personalized information or identifies the user and the phone plays operator messages comprise a customer name. An example message may be "[user first name], please insert 40 cents more for the next 3 minutes" where user first name could be "Sylvia". The phone system central office servers, or local phone itself may comprise an embodiment of the invention allowing for the creation of the personalized media clip. The identification of the user may be by calling card, credit card, RFID or any biometric input, or any other mechanism whereby a user identification can be determined.

Another example playback device may be a digital cable set-top box where personalization occurs on a cable system server and is sent to the IP address of the cable box or uses the subscriber ID in order to encode a message on a data channel.

Another example playback device may be a toy which may be personalized at the factory at on-line purchase time or at home through a network connection or through a wireless interface to a local computer with a network connection or configured to run as an embodiment of the invention. In the case of internet shopping, the purchaser may choose the personalization clips that are to be inserted into the toy before shipping. For example, this would allow the toy to sound like a famous cartoon character and would arrive at the child preloaded. With inexpensive network devices available, network capable toys would be able to be dynamically loaded with personalized output media clips. Toys containing processing units would be able to switch output media clips based on accelerometers that could be used in order to determine if the older or younger sibling was playing with the toy. For example, the toy may cry out, "[user name] be nice to me", where [user name] would be the rougher of the two children in this example. Context information may be used in this embodiment of the invention as set by the parent. Encryption may be utilized within the media clip holding portion of the device in order to prevent hackers from creating toys with unwanted sounds, words or gestures.

In at least one embodiment of the invention, the time at which playback initiates depends upon the context of the device. Displaying a certain website, reading a particular email, calling a particular person, or being in a certain location are some of the examples of the different contexts that might trigger playback. These non-personal events or values may cause branching in determining what clips to splice together for final playback. For instance, a user of the system might initiate playback by visiting a certain web page (or some other type of online document or program) where the users will hear a personalized greeting from a celebrity. If, for example, the user visits an online bookstore, that user might receive a personal greeting from one of the user's favorite authors who then proceeds to promote his newest novel. If the context information associated with the time of day for example would indicate that a different master clip should be played, i.e., shorter clips from the author in the morning than at night, then embodiments of the invention may take branching actions based on this context information. Other examples include personalized messages via email, a cell phone or some other playback device. In addition, a timer function or calendar function may initiate a media clip transmission. Another example context function producing a asynchronous initiation of a media clip without user intervention may include a location context whereby a GPS receiver in a phone or car initiates a media message based on location. Any non-personalized information or information source may be used as a context source. HTTP is a stateless protocol and connections are generated when needed by a requesting device, therefore, devices accessing embodiments of the invention over this protocol must employ different means in which to recognize asynchronous notification such as polling or maintaining an open connection over a separate communications protocol.

If the media clip is distributed via the WWW, the media clip may be generated and automatically transmitted when the user visits a particular web page. The invention contemplates the use of a variety of different techniques for dynamically generating media clips. In one embodiment, the system obtains user information from a cookie file to instantaneously render a personalized multimedia file. In other instances user data is already known by the system or obtained and confirmed via a log-in process. Session data as passed in a URL or HTTP POST message may also be used in order to determine the personalization variables.

If the media clip is to be distributed via electronic mail, cellular telephone, or some other telecommunication mechanism, embodiments of the invention may utilize a database of user information to assemble the media clip. A content provider that wishes to distribute a media clip (e.g., a personalized advertisement or some other personalized media clip) could provide a request to the system for processing. The system utilizes the request, which identifies or contains at least one master clip to be readied for playback and contains type information associated with each of the locations where insert clips are to be merged into the master clip. The type information is then utilized to obtain user information from a system database and the user information is in turn used to obtain relevant insert clips for purposes of generating a media file. Once the insert clips are obtained the system merges them together with the master clip and distributes the completed media clip to the user via email or any other distribution means.

Other embodiments of the invention would, for example, allow a manager to notify all members of his or her team in a personalized manner that there was a meeting on Monday, saving many phone messages. The master clip could in this example could be recorded and saved on a cell phone with each persons name recorded on the cell phone as well. Embodiments of the invention may contain software interfaces allowing the user to in effect produce the master clip by holding a given button when recording the master clip and assert another button when recording each variable insert clip. Alternatively, the user could simply access save bulk personalization messages and send them en masse when needed as in the case of staff meetings. Embodiments of the invention may alternatively operate without manager intervention whereby the group to be invited to the staff meeting is contained within a server and a calendar function on a management server sends personalized media clips to the attendees a predetermined amount of time before the meeting.

System Methodologies and Components FIG. 1 shows an example of the process for generating and dispatching context dependent media clips, also known as context clips, in accordance with an embodiment of the invention. At step 110, the system embodying one or more aspects of the invention obtains user information along with a request for a document or data stream having an associated media clip. Such user information may be obtained via the user interface (e.g., a web browser) that initiated the request. However, in other embodiments of the invention, the user information is obtained separately from the request for data. For instance, the request may come when the user opts-in to receiving media clips generated using the technique described herein and the user information may be obtained during that opt-in process. The media clip, however, may be delivered for playback any time subsequent to the opt-in or to a registration process possibly in an asynchronous manner if the communications protocol over which the media clip is to travel supports such a mode of transfer.

Although the invention contemplates the use of many different interfaces (e.g., a web interface, email client, and/or any other type of device configured to execute playback of the media clip) there are some specific details and generalities associated with the use of each type of interface. For instance, the web interface and/or email interface provides users with a way to access, through an interconnection fabric such as a computer network, one or more server sites. To this end the client and server system supports any type of network communication, including, but not limited to wireless networks, networking through telecommunications systems such as the phone system, optical networks and any other data transport mechanism that enables a client system to communicate with a server system. The user interface also supports data streaming, as in the case of streaming multimedia data to a browser plug-in, a multimedia player, and/or any type of hardware device capable of playing multimedia data. In addition, other embodiments of the invention may utilize web service interfaces, or may take advantage of peer-to-peer architectures for obtaining and splicing clips to one another and delivering them to one or a great number of users.

In accordance with one or more embodiments of the invention, the user interface provides a mechanism for obtaining a unique identifier associated with each user that accesses the system. Any data item that uniquely identifies a user or device is referred to as a unique identifier. For instance a serial number and/or a user name and password can act as a unique identifier and thereby provide access to the system while restricting unauthorized access. In at least one implementation of the invention the unique identifier is a cookie file containing user information (e.g., user name, age, and any other information about the user) or a URL or pointer to the appropriate user information. Once the system obtains the cookie information, that information is used for purposes of rendering a personalized multimedia file. For instance, the system can utilize the information contained within the cookie file to determine which insert clip to associate with a master clip for purposes of rendering the media clip. In other examples, the system may use a third party authentication services (e.g., Microsoft's Passport™) to authorize access to the system. By identifying users, embodiments of the invention are configured to selectively determine the content of the multimedia data based on user information such as a user type, and user preferences.

At step 120, the system obtains one or more clips (e.g., master clip and/or insert clip(s)) that are to be merged together in order to generate the appropriate media clip. The system may obtain master clips, insert clips, and/or other multimedia clips from a variety of locations. Such locations include database storage systems, data files, network locations, hard drives, optical storage devices and any medium capable of storing data including but not limited to network resources comprising web services and peer-to-peer networks. In an embodiment of the invention, the storage location is a relational database system. A database system may hold the master clips and/or insert clips used to generate the media clips and/or a variety of other data or metadata associated with each media clip. The data associated with the media clip allows for categorizing, classifying and searching media clips based on attributes. In addition, metadata further comprises information about the clip including insert points, variable names at insert points, durations, and other items. Database systems may be configured to index data in the database for purposes of expediting the process of searching for specific information in the database. The database may comprise multiple mirrors to enable the system to scale up to handle a large number of concurrent users.

At step 130, embodiments of the invention optionally obtain context information from any number of sources. For example, multimedia attributes may be obtained from a database system, time from a clock system, events information from a calendaring system, geographical information from a global positioning system and any other system capable of providing context information to embodiments of the invention. Context information may combine attribute information and rule information to determine a means and time for initiating playback. For example, an event originating from a calendaring system may specify which delivery means to use for delivering the output media clip depending on time of the day, type of the event, events preceding (or succeeding) the event, or location of the user. If the user is online, playback may be via the web interface, or if the user is using email playback may be in the form of an email. If the user is not actively involved in these activities at playback time, the playback may be redirected to a cellular phone. The system may use other context attributes to determine exclusion rules between media clips. For example, insert media clips designed for use in certain contexts such as happy occasions, may only be used in some context categories and not others. By using intelligent tools to interpret context rules, embodiments of the invention allow for providing an engine that may automatically handle tasks on behalf of persons.

At step 140, the system generates the media clip using user input and optionally the context information to select the appropriate set of one or more master clips and/or a set of one or more insert clips to merge together for playback. The system may utilize context information (e.g. user preferences) to determine the types of media clips to be used, the type of processing which embodiments of the invention are to perform, and/or the type of mechanism to be utilized for delivery and/or playback. Embodiments of the invention may carry out any type of audio, video or other media processing. For example, the system can mix insert clips with the master clip, by replacing portions of the master clip or interleaving over blank portions of the master. Other embodiments of the invention may combine this data into a Flash file or stream.

Figure 2:
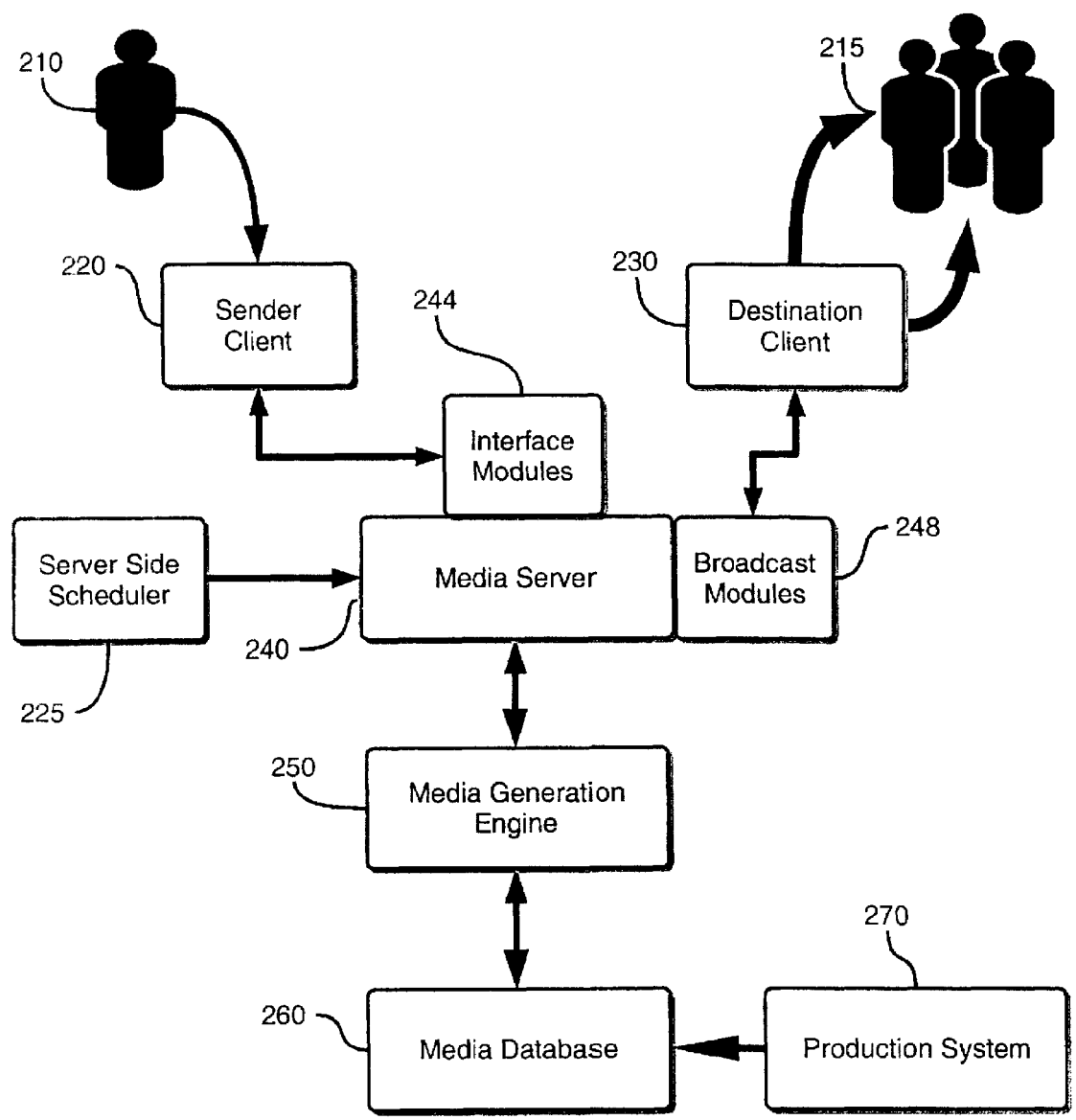
FIG. 2 illustrates the elements of the system for generating and dispatching personalized media clips in accordance with one or more embodiments of the invention.

FIG. 2 is a block diagram illustrating the various components of a system configured to generate and dispatch media clips. Embodiments of the invention provide distributing user 210 with a way to generate and distribute media clips to one or more other recipients such as users 215. The reader should note that the term user and/or recipient as contained herein refers to a person using an embodiment of the invention and/or to processes such as computer applications that are programmed to run at specific times and execute programmed tasks. Typically, distributing user 210 utilizes a sender client 220. A sender client 210 is typically a computing device capable of communicating through a network with one or more types of networks. The computing device may be a computer equipped with at least one processor, memory and storage media. The computing device is equipped and configured to communicate using at least one network communication means. For example, a client may be equipped with a modem to communicate through (wire based or wave based wireless) telephone services. The computing device is configured to communicate through one or more networking protocols (for example, Transmission Control Protocol (TCP) in combination with the Internet Protocol (IP)) to support access and communication between devices though a network such as the Internet.

Computing devices include cellular telephones, Personal Digital Assistants (PDA), desktop computers, laptop computers and any electronic apparatus capable of communicating though a wire-based and/or wireless network. A computing device typically runs applications capable of supporting one or more networking protocols, and processing and interpreting network data. For example, a client may be a personal digital assistant equipped with a browser capable of rendering Hypertext Markup Language (HTML), a JAVA virtual machine capable of running applets received from a remote server, and any other computer program code that supports communication between the user and a remote machine. Other applications allow the user to upload personal media clips such as an email client, data streaming service supported by the client, a HyperText Transport Protocol (HTTP) posting and any other means that allows a user to post media clips to a server.

Destination client 230 (also referred as a playback device) are also computing device with the distinctive feature that they provide a multimedia player or they allow access to a location that supports multimedia playing. For example, a destination client may be a telephone set that allows one or more users to access a broadcast module 248 to remotely play media clips. Other types of multimedia destination clients may consist of a desktop computer equipped with a multimedia player, a personal digital assistant and any other electronic device capable of playing a media clip or allowing access to a network location that delivers media clips (e.g. Multimedia streaming server).

Media server 240 is designed to handle access to and the processing of media clips and typically comprises one or more user interface modules 244 capable of handling communication to users (and/or optionally receivers) for purposes of obtaining user input. Interface modules 244 may provide, for example, common gateway interface program or servlets engine for generating web pages, and receiving and interpreting user input. For example, the interface modules allow users to authenticate with a website, and retrieve user preferences in order to generate customized web pages to the user. Customized web pages may also be based on other user's preferences. For example, if a user is part of a team following one or more definitions, the user may have access to information in the databases based not only on the user preferences, but also on permission defined by other users or the groups to which that user belongs. Other context information may be retrieved from a plurality of sources such as calendaring systems, location information systems and any other system that can interface with embodiments of the invention.

The multimedia server 240 is capable of connecting to third party servers (e.g., other websites), local or remote databases to collect context and/or media clips information. User input may be provided by a scheduler sub-system 225. The scheduler 225 may be on the server side, such as shown on FIG. 2, and/or on the client side (not shown), such as in a input client 220. The scheduler provides a mechanism for choosing context information or types of context information and media clips, and utilizes the user input to automatically schedule tasks (e.g., playback) for execution on systems embodying aspects of the invention. Destination client 230 may also comprise a scheduler component in order to poll for media clips from media server 240 via broadcast modules 248. Scheduler 225 comprises one or more software components, threads, processes or computer programs running on one or more client and/or server machines. For example, a scheduler may have a calendaring system running on a client machine that communicates with one or more calendaring systems running on one or more client or server systems designed to work in collaboration to determine the context of events. In the latter example, a first user may program a first scheduler to communicate with schedulers and conditionally determine (e.g. depending on information obtained from other systems) how to generate an input that is provided to embodiments of the invention.

Systems embodying the invention may optionally utilize multimedia generation engine 250 to process media clips. For example, after media server 240 determines the context and the master and insert clips to use for generating the output media clips, media server 240 may communicate that information to media generation engine 250 so media generation engine 250 can retrieve the data for the media clips from one or more storage locations in media database 260. Media server 240 uses the input information to generate one or more media clips. Multimedia media clips generation involves applying one or more processing algorithms to the input data. Typical processing involves merging/mixing, audio dubbing, inserting media clips and any other type of processing that takes one or more media clips and generating one or more new media clips based on context information. Media server 240 may employ a highly optimized multi-threaded compressed media seamless splicing process in order to maximize the number of connections, network throughput and users 215 that can be processed per media server 240 per unit time. Furthermore, embodiments of the invention may employ a cache in order to further minimize the processing involved for repetitive access applications whereby each successive access avoids accessing media database 260 and the associated delays with accessing a database versus reading memory directly.

In embodiments of the invention, media database 260 is typically a commercial available or freeware relational database management system (RDBMS). Storage locations may also be any file system accessible locally or through a network.

Systems embodying the invention may comprise a separate multimedia production system 270 while other embodiments of the invention may comprise a multimedia production software component running on sender client 220, destination client 230, media server 240 or in any other computer in the system. Typically a multimedia production system allows a user to utilize newly recorded media clips, or existing media clips to edit the media clips and prepare the media clips for usage with embodiments of the invention. The production phase is disclosed below in further detail, and involves producing media clips properties, attributes and symbols to allow, at a later stage, the multimedia generation engine to combine a plurality of media clips to generate an output one or more media clips. Production system 270 allows a producer to create clips using real life recording or computer generated media that include audio, video or any other electronic data format. The production system allows users to generate master clips while saving insertion points, variable names for those insertion points and other attributes that associate the master clip with context information, and relationships between media clips.

Figure 3:
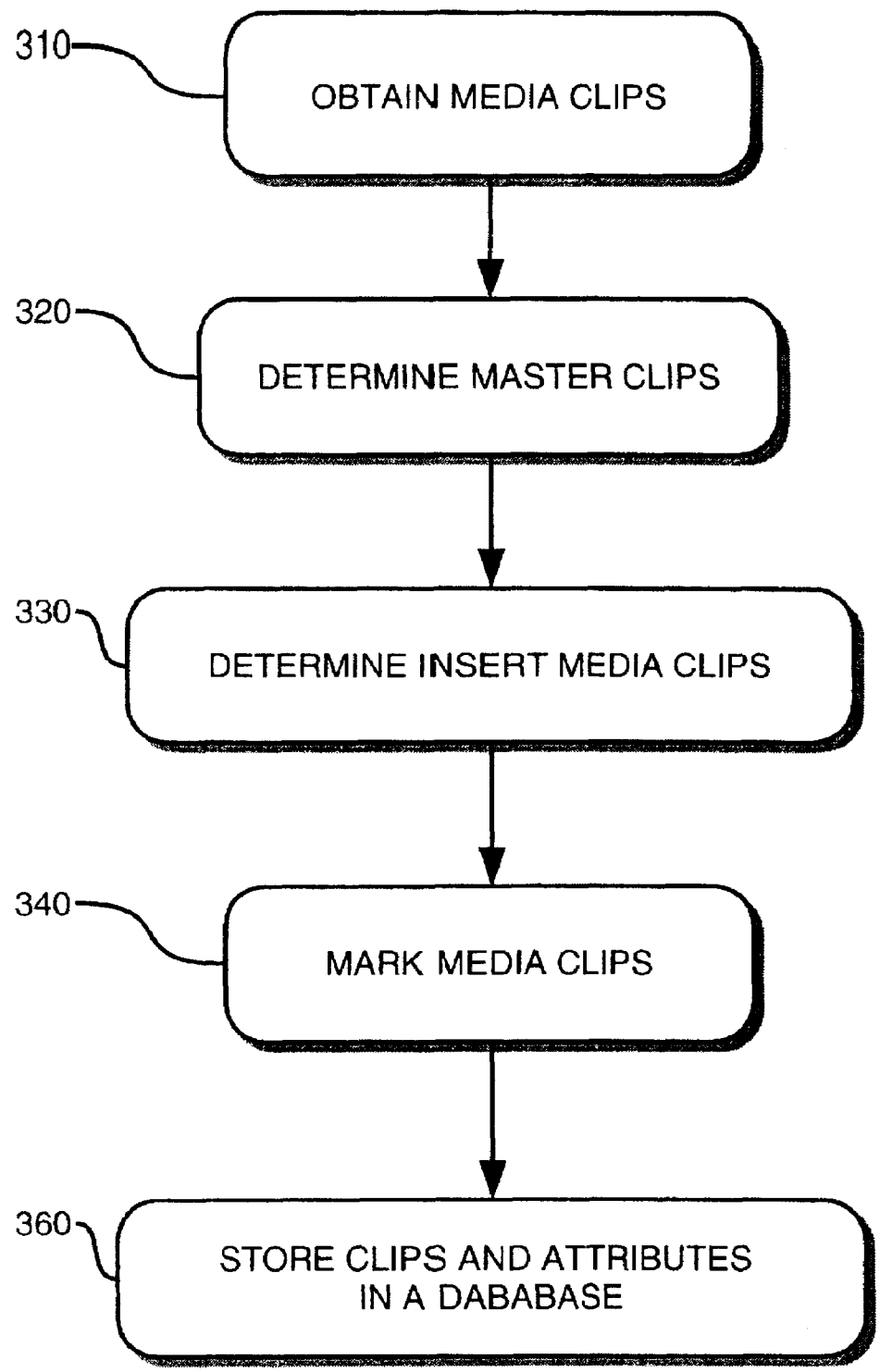
FIG. 3 illustrates the process for producing personalized media clips in accordance with one or more embodiments of the invention.

FIG. 3 illustrates the process for producing media clips in accordance with an embodiment of the invention. At step 310, the system obtains one or more clips and/or other media clips. Step 310 may involve recording a live performance (e.g., a commercial or an artistic performance by a band), or capturing computer synthesized sounds. At step 320, the producer identifies the clips that are to become master clips and edits the clips or the voice track of a clip or clips in order to leave gaps for dropping one or more insert clips. For purposes of aiding in the retrieval of a particular clip, the producer may also input attributes to describe the sounds or the images in the media clips. Some examples of data that may serve as attributes are text keywords and key phrases, a sound clip preview, an image preview or any other data format that may characterize a media clip.

At step 330, the producer also determines among all available media clips those that are designed to be insert clips. Insert clips are fashioned in embodiments of the invention to be inserted or mixed at one or more locations in one or more media clips (e.g., master clips). In some instances insert clips are artfully recorded to fill a predetermined duration of time. If a master clip leaves a gap of 3 seconds to place a person's name, the insert clip is recorded to fill up the entire 3 seconds. Thus, the underlying music track seamlessly integrates the master clip together with the insert clip. An insert clip may itself be a master clip, if the insert clip is designed for mixing with other media clips. The system also provides a mechanism for associating insert clips with keywords, key phrases, sound preview, image preview and any other data format that allow the system to identify, classify, sort or other manipulate the insert clip for purposes of data management, this information is commonly known as metadata.

At step 340, the master clip producer marks the clip with insertion points. The invention contemplates the use of various techniques for marking insertion point. The system may, for instance, embed a signal having an identifiable pattern to mark a particular location in a master clip of other type of media clip. The signal is checked for when the system is looking for a location to place an insert clip. Other approaches involve defining location information and storing the location information along with the media clips (e.g., in a database system) in the form of metadata associated with the clip. Alternatively, the system may utilize a plurality of master clips that each begin and/or end at the point where an insert clip is to be placed. When the master clips are merged together with one or more appropriate insert clips the result is a seamless media clip ready for playback. Using this technique a song or some other type of recorded information is split into a set of compressed or uncompressed sequential files (e.g., WAV, AVI, MP3, OGG, etc . . . ), certain files are identified as insert files, the voice track is removed from the insert files, and an insert clip is recorded over the insert file. This allows for the appearance of an original recording since the background music continues to play along while a vocally personalized or context associated phrase is inserted into the media clip.

In other embodiments of the invention, there is no need to remove the voice track because the insert clips are recorded without such information. Thus, the producer can create the insert clip by simply adding the appropriate voice data to the clip. In either case the master clips and insert clips are then merged together to create a finalized media clip. The system may generate the media clip on the fly by integrating the appropriate master clips and insert clips together, or it may retrieve a previously created media clip from the database. The producer of a media clip may define mixing and insertion properties. The system may use such properties to define the way an insert clip is merged together with one or more master clips. For instance, properties may enable the system to know when to fade the master clip signal to allow for seamless integration of an insert clip and slowly return to normal after the insert clip completes. The markings indicating the split and merge locations may be embedded codes or metadata stored separate from the clip.

At step 360, the multimedia data (e.g., master clips, insert clips, finished media clips, and/or any other accompany multimedia data) is stored in a suitable location. Some examples, of the types of location appropriate for one or more embodiments of the invention include a database system or any other type of data repository. If high availability is desired, the database system can mirror the data across several networks nodes. The databases system may also contain attributes and properties relating to each of the clips. Such information provides a mechanism for determine which clip is appropriate in a given context and for determining what variables a clip has and their locations and durations.

Figure 4:
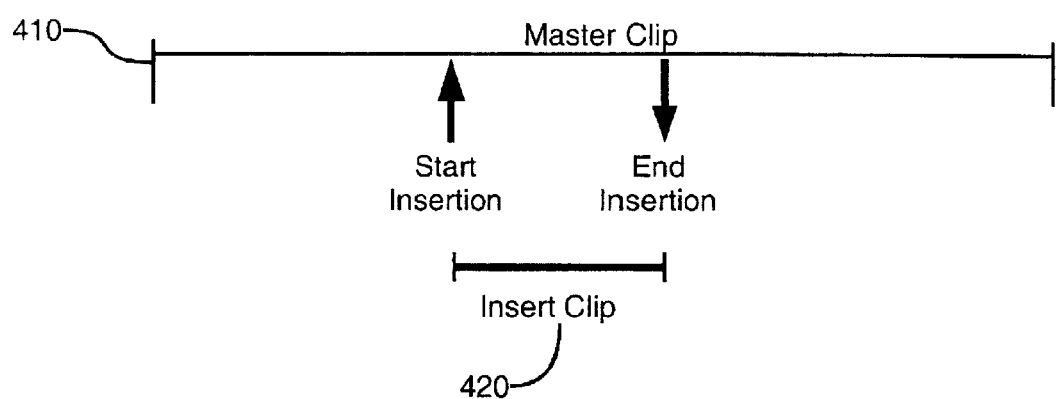
FIG. 4 is a block diagram representing the elements of one or more media clips configured in accordance with one or more embodiments of the invention.

FIG. 4 illustrates the components of a media clip configured in accordance with an embodiment of the invention. Master clip 410 contains any type of multimedia data including, but not limited to, audio and/or video. One or more master clips can be merged together to create a media clip ready for playback. Insert clip 420 can also contain any type of data (e.g., audio, video, etc . . . ). The system may combine two or more media clips to form either a master clip or insert clip so long as the clips have at least one property in common. For example, an audio clip may be merged with a video clip if the audio track included with the video clip has the same characteristics as the audio clip to be inserted. If the clips have a mismatch in sampling rate or format, they may be normalized before combining. Clips with different lengths may be front or back-end truncated or cross sampled faster or slow in order to fit the clip within the desired slot. Alternatively, the master clip may contain metadata stating that the time slot to fit an insert clip into is not fixed, meaning that the clips can simply be concatenated one after the other since there may not be background sound information which would cause a non-seamless splice to occur. This can also be thought of as appending master clips back to back, for example if no fixed time gap was left in a given master clip and another clip such as an insert clip is to be appended before yet another master clip. Regardless of the nomenclature, the idea is that the independent clips are seamlessly spliced in order to produce an output clip that is perceived as a single recorded clip. The location where the system interleaves insert clip 420 with one or more master clips 410 is marked by a start and end point, or start point and duration. The insert clip is recorded to use the entire duration between the start and end point, thereby allowing the insert clip to sound or appear seamlessly integrated with the master clip.

Figure 5:
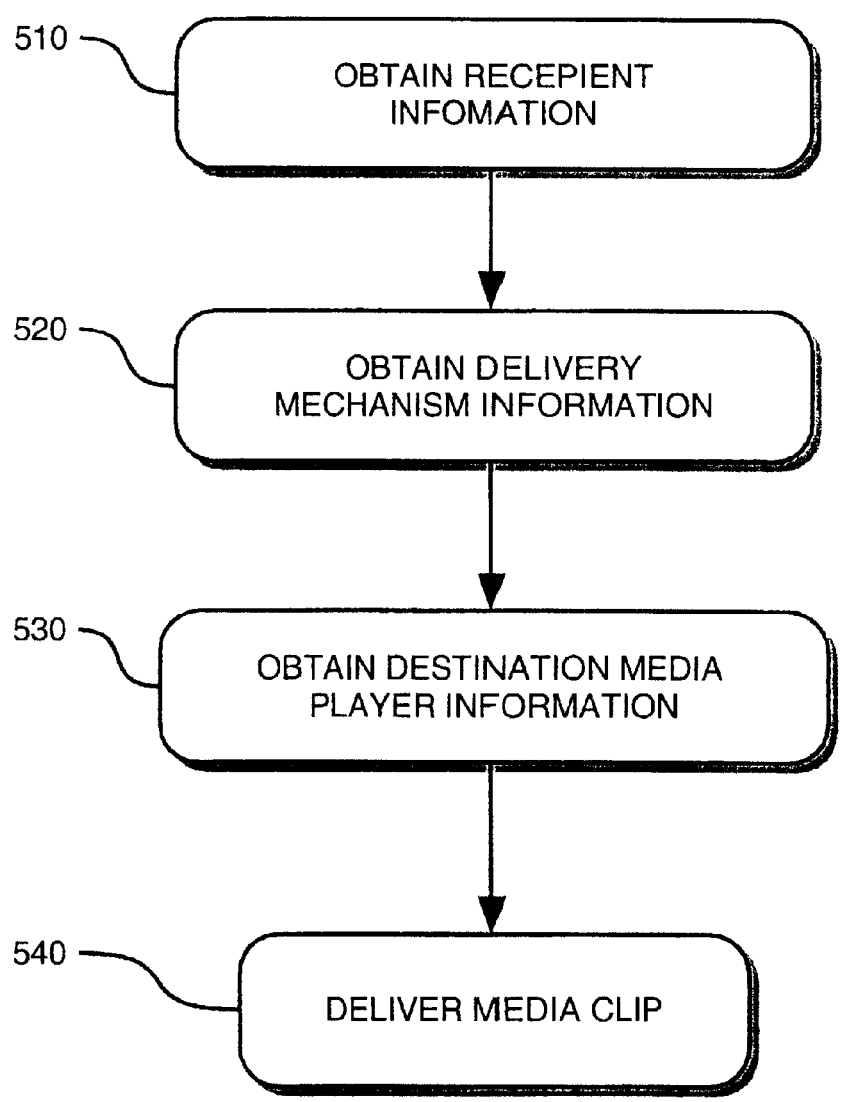
FIG. 5 illustrates the process for dispatching personalized media clips in accordance with one or more embodiments of the invention.

FIG. 5 illustrates the method steps involved in dispatching media clips in accordance with embodiments of the invention. At step 510, the system obtains information about one or more recipients of the media clip using any number of suitable techniques. For instance, the system may obtain recipient information from a storage location such as a database system, from user input (e.g. via cookies using a web interface), from the recipient's device (e.g., a unique identifier), or from any other medium capable of transferring information about recipients to the system. For example, when a user connects to the system and requests a personalized media clip (e.g., via an earlier opt-in, by belonging a certain group such as AOL®, or by a specific request), the system may obtain information about the recipient and/or characteristics about the receiver's multimedia player. In the latter case, the system generates the customized media clip in a format compatible with the multimedia player. In other instances, the system obtains the multimedia player characteristics at the time when the receiver connects to the system. The system then adapts the format of the media clip to match the playback format to one that is compatible with the multimedia player.

At step 520, the system determines a mechanism for delivery of the media clip assembled using the process described in FIG. 3. The system is configured to deliver customized media clips utilizing one or more different delivery mechanisms. Some examples of the type of delivery mechanisms various embodiments of the invention utilize are telecommunications systems (e.g., the telephone or any other data network), data streaming using a network transport protocol, electronic mail systems, or any other medium capable of transporting electronic or digital data. The system may obtain information about the delivery mechanism from a database system, user input, or using context information sources such as a calendaring or Global Positioning System (GPS). For example, a first user sending a media clip to one or more end-users may specify the delivery mechanism the system may use to reach each receiver. The user may specify the multimedia media clip should be sent as an electronic mail attachment. The user or internal context information may specify the delivery as a web hyper-link, delivered through electronic mail, for example, the end-users may click through to view the media clip from a data stream. Systems embodying the invention can also deliver content to a telephone voicemail, or directly make a telephone call to one or more recipients and deliver the media clip to persons as an audio message.

At step 530, the system determines an appropriate format for the media clip. For example, the device to be used for playback may support one or more playback formats. In addition, sometimes different versions of the same multimedia player may support slightly or substantially different data formats. The system is configured to adapt to these inconsistencies by determining what format is desirable for the destination media player and then converting the media clip to that format. The system may obtain the type of data format supported by the multimedia player directly from the device, the user, or it may retrieve such information from a database containing manufacturer information.

At step 540, the system delivers the personalized media clip to the media player for playback using one or more delivery protocols. For example, the system may deliver media clips through an Internet data stream over Internet protocol or by using any other data delivery medium including but not limited to dedicated phone lines, cable modems, satellite systems or any other communications system hosting a communications protocol.

Figure 10:
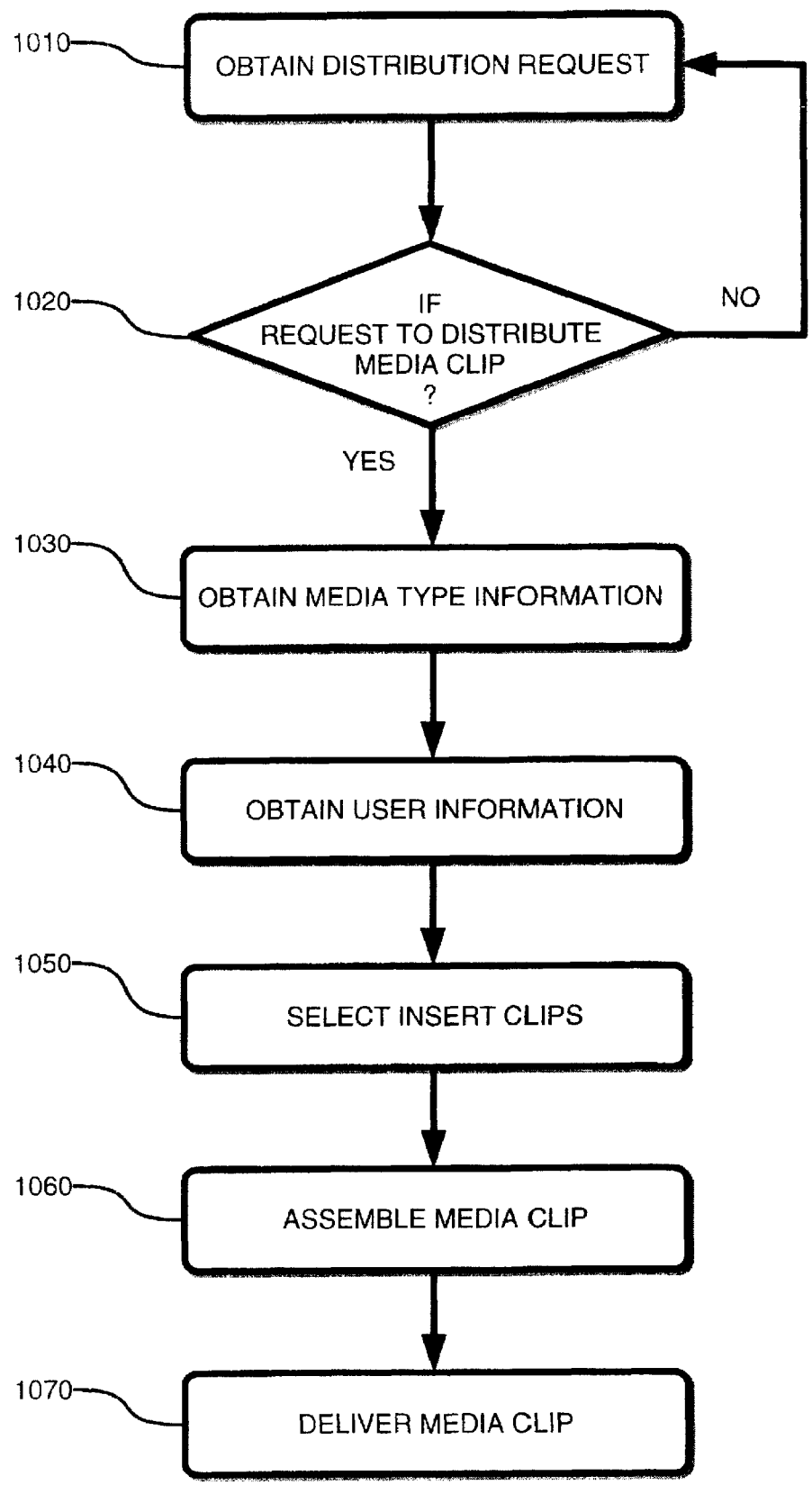
FIG. 10 illustrates the process for handling a request to deliver one or more personalized media clips to one or more recipients in accordance with embodiments of the invention.

FIG. 10 illustrates the process for handling a request to deliver one or more personalized media clips to one or more recipients in accordance with embodiments of the invention. At step 1010, the system receives a request to distribute one or more personalized media clips to a set of users. A user that wishes to initiate such a request may utilize any type of user interface to define the parameters of the request. For instance, the user may select a media clip to be personalized and a receiving user or category of receiving users to which the media clip is to be distributed via the user interface.

The user initiating the request may designate one or more recipients based on selected identifiable criteria and/or choice. The system utilizes the request, which identifies or contains at least one master clip to be readied for playback and contains type information associated with each of the locations where insert clips are to be merged into the master clip. The request may optionally contain one or more master clips and/or one or more insert clips, however, the request may also identify the master clip to be used and the system may utilize type information to obtain the appropriate insert clip.

At step 1020, the system determines if the request is proper (e.g., contains enough information for the system to generate and/or distributes a media clip). In instances where the request is invalid the system prompts the user for additional information and/or exits if such information is not received. The request may alternatively indicate the user data or other data in the request is to be stored for later use or distributed at a particular time. If the personalized media clips are to be queued for distribution, the system may generate a set of personalized media clips to ready them for delivery to the identified set of one or more users. At step 1030, the system obtains the media type information from one or more data sources (e.g., the request, master clip, or some other appropriate data source). That type information defines what is to be inserted into one or more master clips via one or more insert clips. For instance, if the master clip, otherwise known as a personalized media clip, is an audio version of an incoming mail message such as "You Have Mail [user name]", i.e., a personalized version of the AOL® mail notification message, the type information identifies that a particular portion of the media clip requires name data.

The type information can also identify the transport protocol (e.g., TCP/IP, telecommunications network, cell phone network, etc . . . ) and the data format (e.g., MP3, WAV, AVI, etc.) to be used for playback of the media clip. If the format to be used for playback differs from the format of the generated media clip, the system may convert the media clip into a file of the appropriate format.

At step 1040, the system utilizes the type information to obtain the appropriate user and/or other information for use during generation of the media clip. For example, if the type information designates a particular portion of the master clip as "user name" data, the system obtains user name information from a database and generates or obtains an insert clip having that designated user name. Thus, the media clip becomes personalized to the characteristics of the receiving user. Again, if the media clip is the famous "You Have Mail [user name]" AOL® mail notification message with personalization the master clip would have audio information supporting playback of the words "You Have Mail [_____]", where [_____] represents no voice track for a defined duration. The master clip may comprise a background jingle or sound that is mixed with the personalized user name insert clip or conversely, all insert clips may be recorded with the portion of the jingle or sound itself, so that no mixing is required at run-time. The type information would be used to determine that a name belongs in the [_____] location and the system would then locate the name of the target user and generate or obtain an audio clip using that name. If the user's name is "Steve", the system obtains an insert clip having the name Steve and the master clip once merged together becomes "You Have Mail Steve".

The user information associated with the type information includes a user name or some other identifier and any other information associated with a particular person (e.g., address, gender, children's names, etc . . . ). For example, the recipient's gender and/or marital status may be used at a later stage to select the proper clip to addresses the recipient (e.g. "Hello Mr.", "Hello Ms.", "Hello Mrs.", etc . . . ). At step 1050, the system proceeds to select one or more master clips and one or more insert clips after determining the proper combination for each recipient, by utilizing the type information and/or the user information. At step 1060, the system assembles a personalized media clip using the selected master and insert clips. At the latter step the system may utilize one or more techniques for batch processing or caching the processing results. For example, when a sequence of media clips is used in more than one clip, the result of the first mix of that sequence can be stored and subsequently used for the purpose of generating other media clips. The user information may provide a mechanism for determining the format of the media clip depending on the delivery mechanism (e.g. email attachment, voice mail message, web stream etc.).

At step 1070, the system distributes one or more personalized media clips to the appropriate user or set of users. The distribution may be in a form of an electronic mail attachment, an electronic mail message that contains an embedded uniform resource locator for accessing the data on a website, or any other message format. The system may also automatically dial a telephone number (e.g., cell phone) and play one or more media clips over the telephone, or deliver a voice message directly to a voice mailbox. Optionally a user may use a cell phone as in interface to initiate delivery of a media clip to another user via cell phone or any other playback device.

Figure 6:
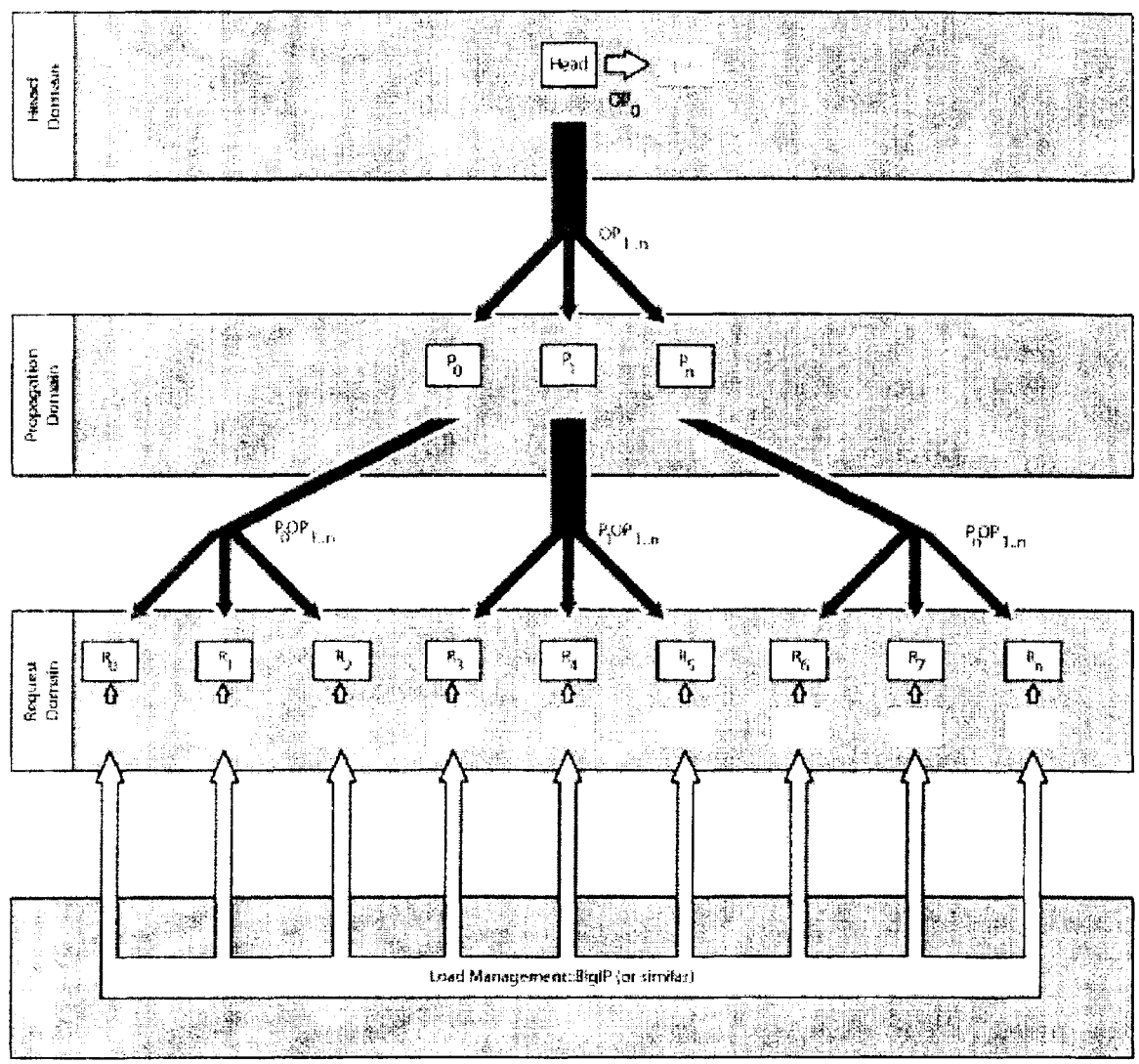
FIG. 6 shows a relationship between Compression Proxies (C), Request Processors (R), Propagators (P), and the Head node in the different application domains in accordance with one or more embodiments of the invention.

System Architecture One or more embodiments of the invention are designed to generate and distribute multimedia clips on low cost server farms of arbitrary size. An embodiment of the invention constructed to handle large numbers of users is shown in FIG. 6. This embodiment is segmented into three physical domains: a) the Head domain, which supplies application definition and content management services, b) the Propagation Domain, which supplies application definition distribution and content distribution services, and c) the Request domain where inbound requests made over the network are accepted and serviced, and optionally transcoded and/or compressed. Alternatively, other embodiments of the invention may run on one computer for small scale production environments.

In a scalable embodiment, servers may be set up "tree" style, with the Head node at the "top" of the tree. The Head node may provide Web-based interfaces for uploading audio content, and defining and managing application behavior. Changes made on the primary server may be propagated first to a backup server, and then to a list of Content Propagators, which in turn may then push content and application definitions to machines in the Request domain defined in the Web based management interface. Other embodiments of the invention may utilize rack mountable servers in a flat configuration where each server is configured as a peer which may command another peer in order to propagate application modifications. Any other architect including but not limited to peer-to-peer architectures may be utilized in other embodiments of the invention in order to provide differing degrees of scalability.

FIG. 6 shows a relationship between Compression Proxies (C), Request Processors (R), Propagators (P), and the Head node in the different application domains in one embodiment of the invention.

Propagation may be configured to be blind wherein Propagators are not explicitly aware of each other, but are aware of the node from which they receive content, and the nodes they are responsible to service. Propagators can service as many machines in the Request domain as permitted by network capacity and performance requirements.

Machines in the Request domain may be configured to be equally independent whereby each node is unaware of other nodes on the network, except optionally for the Content Propagator that services it.

A server in the system can be changed from Request Processor to Content Propagator through the Web based interfaces on the Head node in embodiments of the invention employing a tree or hierarchical architecture. New servers of either type can be added in similar fashion. The Head node interfaces also supply application and content archiving and retirement facilities.

The system is not protocol bound above TCP/IP. Requests to the processors may be accepted as comma separated plain text list, with the application identifier as the lead argument, followed by personalization information, or request may be received as serialized java objects. Any methodology known may be utilized in order to transfer information.

Content may be moved from the Head node to the Propagators to the machines in the Request domain via secure copy (SCP). For embodiments of the invention employing firewalls and DMZ configurations, encrypted copies may or may not be utilized and any method for transferring data may be substituted.

At the bottom of the tree is an optional set of Compression Proxies. Embodiments of the invention making use of highly optimized multi-threaded server processes comprising seamless splicing of compressed media clips may be configured without Compression Proxies. Compression Proxies perform transcoding and/or compression services. Optionally, an additional layer of load balancing equipment can be placed between the Compression Proxies and the Request Processors.

Hardware The system can be hosted on many different types of hardware. An example of the type of hardware configuration may comprise three Dell PowerEdge 2400 servers each with dual Pentium III Xeon processors with 512K L2 cache running at 500 MHz. Each server may be configured with 1 GB of 133 MHz main memory and 42 GB (6×7 GB) storage configured with software RAID 0+1. The machines may be connected through a low-cost hub with standard category 5 Ethernet cable. Alternatively the system may be deployed on higher density blade servers. Logically, systems that employ MPEG 3 encoding gain substantial performance benefits from faster processor speeds. Embodiments using seamless splicing of compressed formats may server higher numbers of users since the processing requirements of such implementations is significantly lower. This is due to the fact that encoding the output data does not have to occur on the entire output media clip as when raw insert clips are added to a raw master clip. Some compressed formats allow frames to be inserted in the middle of other frames without altering portions of the preceding or succeeding frames. These compression formats can be used in order to pre-encode master clips and pre-encode insert clips before splicing them together. This optimization can yield a 300 times increase in numbers of users serviced per second versus a non-cached raw master and raw insert clip splice methodology and subsequent compression and network transmission.

Embodiments of the invention employing a tree architecture and designed for ease of maintenance may employ identical hardware for the Head node, Propagator nodes, and Request Processor nodes. The only exception is the optional Compression Proxies, which require almost no storage. In an optimized deployment, substantial cost savings and performance improvement could very reasonably be achieved by changing the hardware configuration for machines in each domain: loading the machines in the Request domain with additional memory and processors, and loading the Content Propagators and Head node with additional storage. Thus, although specific hardware examples are given, embodiments of the invention may utilize any type of computer hardware suitable for handling the amount of load placed on the system.

The system design presupposes the existence of separate load balancing hardware such as F5 BigIP servers, and does not provide any inherent load balancing capabilities in software or hardware, however one of ordinary skill in the art will recognize that such load balancing capabilities could be added to the system.

Head Domain The Head node supplies content management and application definition and management services through a Web based interface. Media files are uploaded to this server and logically associated with applications, then pushed to the Propagators. The interfaces supply additional system management functions—allowing the administrator to centrally manage and monitor the server relationships below the Head node. The interfaces allow the retirement and archiving of applications for redeployment at a later date.

Propagation Domain The Content Propagators are servers that provide distribution services for application definition files and audio resources. These servers automatically redistribute files to the Request domain upon receipt, and sends configuration directives to machines in the Request domain.

Request Domain The machines in the Request Domain perform several task-specific functions, and operate as the workhorses of the system, accepting and servicing inbound requests for applications. The machines in this domain are almost totally independent—they are unaware of other machines in the domain. A example commercial architecture may comprise 9 machines in the Request Domain, 3 in the Propagation Domain, and 2 Head nodes. Optional Compression Proxies increase the nominal architecture by 9 machines.

Software Third Party Software Embodiments of the invention can execute on multiple platforms using multiple kinds of operating systems. In one embodiment of the invention systems run FreeBSD 4.5, with non-essential services disabled. The Head node may comprise the Apache Web server (1.3.24), mod PHP (4.2.0), mod SSL (2.8.8), and PostgreSQL (7.2.1) as the content and resource management architecture. The administrative interfaces on the Head node may be stored primarily as database resources, and delivered by PHP over SSL. A proprietary DOM 1/ECMA 2.6.2 Edition 1 compliant windowing toolkit is used to define the interfaces. Servers may run OpenSSH (2.3.0). Content transfer on the Head node and Propagation servers is performed using (Bourne shell) script driven Secure Copy.

Compression proxies may run a proprietary "hand-off" request processor, and may implement gzip encoding. Open source encoder program LAME may be used for MPEG 3 transcoding on any computer within the system.

Proprietary Software Application Overview An embodiment of the invention may utilize machines in the Request domain that run an application for generating multimedia clips by merging one or more master clips with an appropriate set of one or more insert clips. The process used in this embodiment of the invention may be a threaded POSIX (1003.1c) compliant binary and may have a single external library dependency: the FreeBSD port of the Linuxthreads package.

Figure 7:
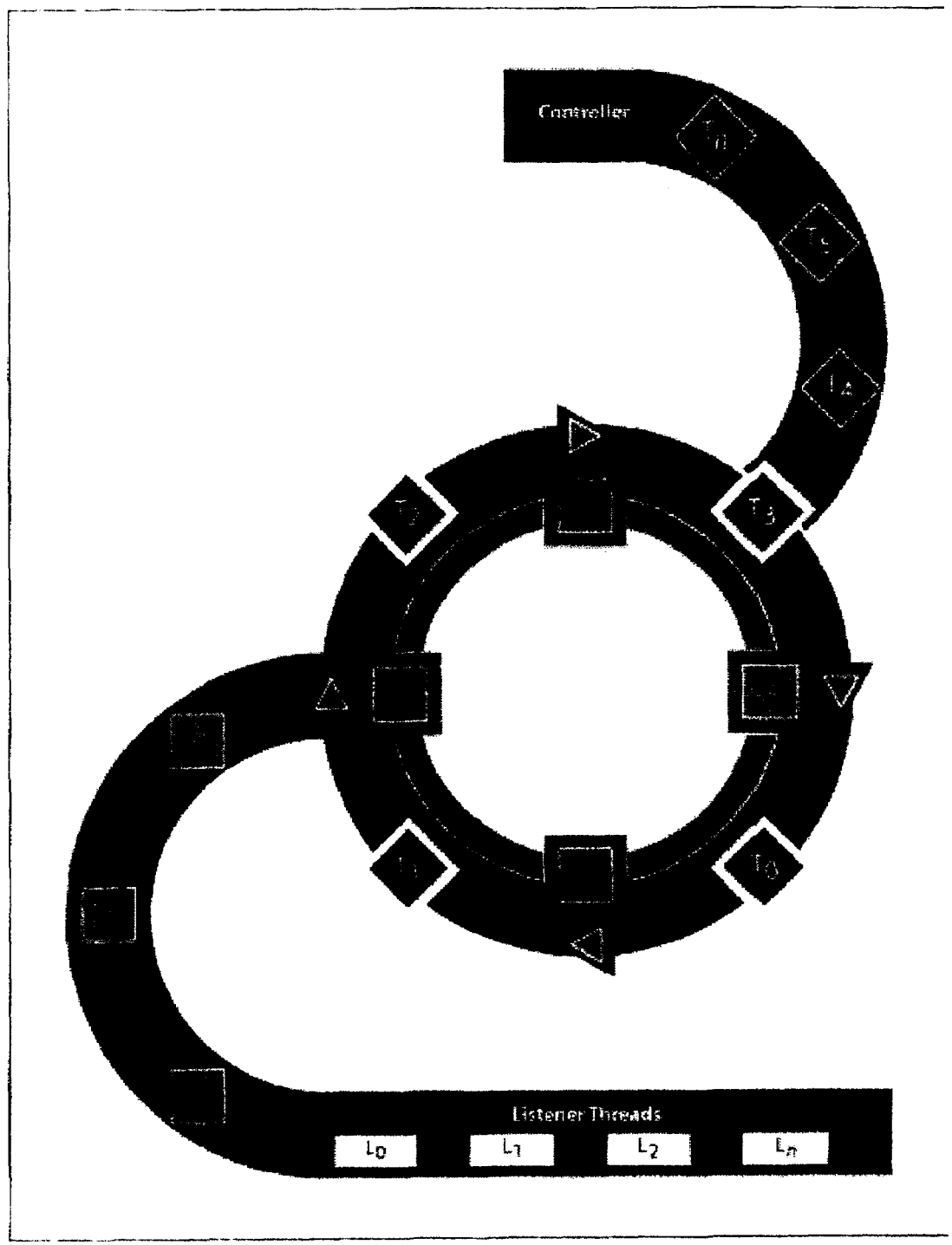
FIG. 7 is a conceptual drawing of the Listener, Connection (C), Controller, and Processing thread interaction.

FIG. 7 illustrates a conceptual drawing of the Listener, Connection (C), Controller, and Processing thread interaction. The server in this embodiment comprises a process that manages three primary components: a) a Controller thread which encompasses a Configuration Loader, spawns new Request Listeners in response to increases in request volume, and listens for signals b) a Request Processor, and c) a Cache. The Request Processor (b) manages Processor threads (T0, T1, T2, T3, T4, T5 and Tn), which traverse a queue created by the Request Listeners and dequeue and enqueue connections (C1, C2, C3, C4, C5 and Cn) based on the availability of system resources (e.g. non-blocking I/O, cache entries), and Cache Management threads which manage resource caching according to the Cache Policy.

Controller At startup (or in response to a HUP), the Controller purges the cache and reads the configuration file, which supplies information that ties applications (logical entities) with resources (physical entities). The Controller is responsible for the generation of Listener threads in response to system demand. Listener threads accept requests, enqueue the resultant connection, and then returns to listening for additional connections. The controller is also responsible for gracefully shutting down the system and for optionally saving the cache to non-volatile memory since startup creation of the cache is computationally expensive.

Request Processor Threads As connections are enqueued, the Request Processor threads dequeue the connections, and then attempt to fetch associated resources from the cache. If a resource exists within the cache, the fetch will return a pointer to the entry. If a requested resource is not currently available as a cache entry, the fetch will create an empty entry in the cache and return a pointer to the empty entry. In this case, the Request Processor thread will enqueue the current connection for later processing, and dequeue the next connection for immediate processing.

Cache Management Threads Concurrent to this process, the Cache Management threads perform a similar enqueue/dequeue routine. When an empty entry is found in the cache (the result of a request for a non-cached resource), the Cache Management thread responsible for the node loads the appropriate resource from the file system in adherence to the Cache Policy, and sets a "ready" flag on the entry.

Cache Structure Entries in the cache reflect a two part structure: leading header information that indicates the identity and attributes (e.g. length, persistence, last use, readiness) of an entry, and raw resource data (file-type header information is removed).

Cache Policy The cache policy may be implemented as a Least Recently Used (LRU) algorithm, weighted against the size of a resource considered for un-caching in the event the cache is full at the time a resource must be loaded from the file system. Functionally this entails the keeping of two structures to manage the cache: a structure that permits efficient traversal of cache entries (based on identity), and a structure that permits the efficient search of the Last Used attribute of the cache entries. At least one embodiment of the invention may use different algorithms for cache management depending upon the need of the system. Embodiments may employ various algorithms that trade speed for memory conservation.

Response When all resources to process a request are available, a Request Processor assembles the resource header for the complete request, and then traverses the string of pointers for the associated cache entries, delivering their contents directly from memory. When it has finished, the connection is closed, dequeued and subsequently destroyed. Optionally, the server can be configured to use persistent connections, in which case the connection may be reset to a read state and returned to the queue.

Compression Proxies/Response Transcoding (Optional) In volume systems it may be desirable to transcode and/or compress the response because of the impressive reduction in network load offered by such compression. The system may perform WAV to MPEG 3 transcoding using LAME or any other encoder capable of compressing data into formats required for output by embodiments of the invention. While this scheme dramatically increases audio quality and/or reduces network demand by a dramatic ratio (10:1), transcoding and compression place very heavy load on the Request Processors. For this reason, one embodiment of the invention performs transcoding and compression on a layer of Compression Proxies positioned "in front" of the Request Processors. This configuration also offers the addition of more load balancing equipment between the two layers.

Another embodiment of the invention utilizes an encoder with settings designed to allow for seamless splicing of compressed media. This eliminates the need for a layer of compression proxies and creates a system that is approximately 300 times faster than a brute force WAVE to MPEG-3 media clip cache-less personalization system.

Seamlessly splicing media clips may be performed for certain media types. Raw data types such as WAV, AIFF and AU format files are ordered in time without borrowing bits from preceding or succeeding frames and therefore may be sliced out and added in with impunity. Highly compressed formats may or may not allow for this type of manipulation of individual frames of data since highly compressed formats generally place data in easy-to-compress frames representing simple waveforms that should belong in a hard-to-compress frame. This interlacing of data makes the frames dependent upon one another.

MPEG-3 allows for compression with slight degradation of high end frequency spectrum by encoding frames to hold information only for the current frame. By setting the encoder to abandon the use of the bit reservoir and thereby degrading the frequency response slightly this is achieved. In addition, it is possible but more complex to use variable bit rate encoding with overlapping encodes and achieve frame independence but the recordings must overlap in time. Since the gain in frequency response is minimal and the calculations and bit manipulations are more complex embodiments of the invention using constant bit rate encoding without the bit reservoir may be used in situations where maximum sound quality is not required, and situations where maximum sound quality is required may use variable bit rate encoding with the higher complexity bit manipulation algorithms involved.

Depending on the encoder used for a given format, different artifacts may be created when encoding. For example, the LAME encoder software produces various blank spots on the front and end of encoded clips due to algorithms used in order to decode the clips. Certain encoders use MDCT/filterbank routines functionally similar to decoder routines and leave 528 sample delays at the front of encoded files.

For embodiments of the invention employing LAME, seamless splice media clips may be created by clipping the first granule (576 bits) of the encoding insert clip encoding using LAME software which contains MDCT coefficients and eliminating the ID3 metadata from the file and the last 288 bits at the end of the insert clip. The resulting media clip contains no front or back-end artifacts, metadata or data dependencies to hinder the independent insertion into a master clip.

This optimization allows for extremely high response capabilities when employed with a cache and a multi-threaded non-blocking I/O server process.

System Capacity Caveats Capacity is variably affected by a broad set of conditions: the connection rate of the requestor (s), available network bandwidth (server side), processor speed, number of processors, number of resources in a given application, size of resources in a given application, and available system memory. The following benchmarks are based on the performance of the systems and networks described in this document, and may not be reflective of other network and hardware configurations.

Test Environment Our tests and calculations consisted of a ten second application constructed from 8-bit monaural audio sampled at 11 kHz, at roughly 100 kB per application, referenced hereinafter as an "test application".

This bit depth and sampling rate represent the lowest threshold of consistently achievable, acceptable audio quality balanced with achieving the smallest file size possible. The production values of this scheme are probably unacceptable for continuous music, but they are completely reasonable for jingles and "spoken word" audio information.

The test facilities used possess a limited ability to simulate a real-world network and system demand created by this application under the kind of load it was designed to handle. For some of the results, raw data was used to extrapolate the network demand. In other cases, benchmarks are a combination of real test data and extrapolation of that data. Any information extrapolated has been extrapolated conservatively.

Figure 8:
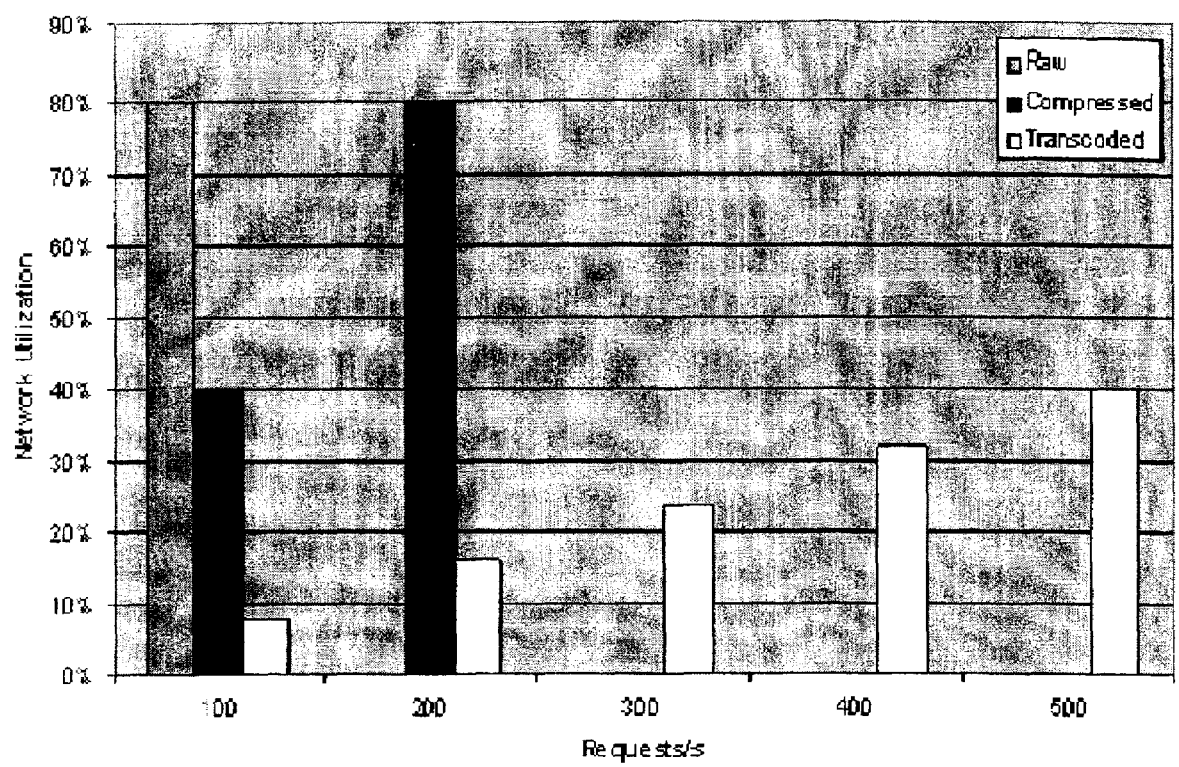
FIG. 8 shows network utilization of a 100 Mb/s sustained link for a ten second application of approximately 100 kB.

Network Requirements (Extrapolated) FIG. 8 shows network utilization of a 100 Mb/s sustained link for a ten second application of approximately 100 kB. In most cases, ten seconds is sufficient to personally identify a user and deliver substantial information (e.g. a call to action, or a short message). The data for FIG. 8 is extrapolated.

Capacity and Concurrency (Request Processors) On some systems implementing one or more aspects of the invention, raw Listener capacity is bounded at approximately 300 connections per second. It should be noted that the number of slots in the processing queue is currently limited by available memory and swap space for the application, so the upper bound of concurrent request processing is ambiguously defined. While flexible, this is less than ideal for several reasons: overuse of swap can push system response times to unacceptable levels under heavy load, "hammering" all waiting requests for the sake of the most recent handful. Embodiments of the invention prevent such limitations by allowing for the tuning of concurrency bounds in the configuration files for the server.

Figure 9:
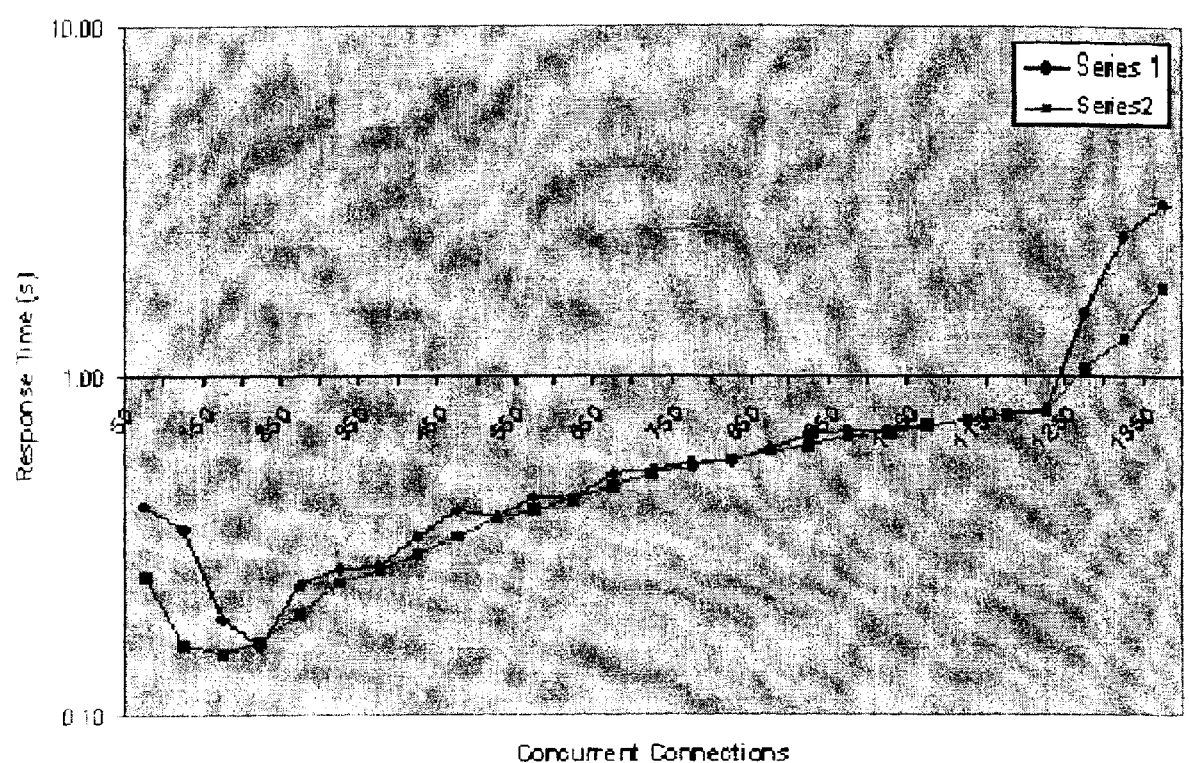
FIG. 9 shows the relationship between response time and request concurrency, assuming a 100 Mb/s connection to the requester.

Our testing indicates that request/response latency rises in a (roughly) sinusoidal progression from <0.1 to 1 seconds as the number of queued requests approaches 1,200, then increases catastrophically as the system begins to thrash swap space to manage Request Processor threads. An internal review of our algorithms and system components suggests there is some additional performance to be extracted from the application, but probably not more than an increase of 10% without employing seamless splicing of compressed clips. FIG. 9 shows the relationship between response time and request concurrency, assuming a 100 Mb/s connection to the requester.

The high initial response time is due to the overhead of thread generation on servers "at rest" at the time the performance evaluation begins.

Capacity and Concurrency (Compression Proxies) The system may utilize a slightly modified version of the same server that runs on the Request Processor on our test Compression Proxy, but the architecture does not preclude the use of other server daemons to perform this function, including standard HTTP servers like Apache and Netscape. Several different servers could run these servers to handler requests made via different protocols.

Usage Environments The invention has applicability in a number of different environments and may be configured to communicate personalized multimedia clips to users at a variety of different receiving devices. The following section illustrates a few different scenarios in which a user may utilize embodiments of the invention to communicate with other users or for systems to communicate with one or more users.

In one scenario, a user utilizes the system embodying the invention to send customized messages (e.g., an invitation, advertisement, reminder, etc . . . ) to one or more other users (e.g., recipients). In this example, a user may connect to a server and input a list of other users who are to receive the customized message. The sending user may select a master clip for distribution and the system assembles a multimedia clip for distribution using the list of user information to identify an appropriate insert clip(s) to merge with the master clip. The system is also capable of retrieving context information to determine the best communication path to reach the recipient and/or the recipient's availability. The system may obtain other context information such as availability information, personal information (e.g. address and phone number), and any other context information useful for purposes of assembling and disseminating the multimedia clip. The system utilizes the context information in several ways. For example, the system may send messages at different times depending on the distance between the residence location of each recipient and the location of the meeting. The system may also send the message using different transport mechanisms depending upon the whereabouts of the recipient. If the user is currently using the Internet, the system may elect to email the message. Otherwise the system may opt to transmit an audio message to a voicemail system or to contact the user by making a cellular phone call.

In another scenario, the system retrieves recipient information (e.g. first and last names, his/her title etc.), and assembles a multimedia clip appropriate for each user. The system may for instance, alter the language, gender, tone, or any other modifiable aspects of the voice track depending upon the characteristics of the user. The system may also select an appropriate mechanism and format for the multimedia clip and thereby produces a multimedia clip specific to each user.

Thus, a method and apparatus for generating and distributing a set of personalized media clips has been described. The claims however and the full scope of any equivalents are what defines the invention.

What is claimed is:

1. An apparatus comprising:
   an insert clip comprising personalized media;
   a master clip comprising having an insertion point;
   a network interface;
   a computer coupled with said network interface wherein said computer further comprises a memory device comprising said insert clip and said master clip;
   a process executing on said computer wherein said process is configured to encode said insert clip into insert clip packets and encode said master clip into master clip packets wherein said insert clip packets and said master clip packets are encoded into a degraded frequency response compressed format wherein each racket selected from said insert clip packets and from said master clip packets holds information only for a time duration of each respective packet and wherein said process is further configured to combine said insert clip with said master clip at said insertion point to create an output clip with undetectable transitions at said insertion point.

2. The apparatus of claim 1 wherein said process is further configured to create said output clip via seamless splicing at said insertion point.

3. The apparatus of claim 1 wherein said personalized media is associated with a username and password combination.

4. The apparatus of claim 1 wherein said personalized media is associated with a browser cookie.

5. The apparatus of claim 1 wherein said personalized media is associated with a PASSPORT® credential.

6. The apparatus of claim 1 wherein said personalized media comprises a name.

7. The apparatus of claim 1 wherein said personalized media comprises a gender.

8. The apparatus of claim 1 wherein said personalized media comprises a product name.

9. The apparatus of claim 1 wherein said process comprises a controller thread, a listener thread, a cache management thread and a request processor thread.

10. The apparatus of claim 1 further comprising a server farm.

11. The apparatus of claim 1 further comprising a load balancer.

12. The apparatus of claim 1 further comprising a web server, a cache and a wherein said memory device further comprises a database.

13. The apparatus of claim 12 wherein said database comprises a database mirror.

14. The apparatus of claim 12 wherein said cache comprises compressed media.

15. The apparatus of claim 14 wherein said compressed media comprises MP3 data.

16. The apparatus of claim 15 wherein said MP3 data is encoded for seamless splicing.

17. The apparatus of claim 14 wherein said compressed media comprises OGG data.

18. The apparatus of claim 14 wherein said compressed media comprises Flash data.

19. The apparatus of claim 14 wherein said compressed media comprises video data.

20. The apparatus of claim 12 wherein said cache comprises uncompressed media.

21. The apparatus of claim 1 further comprising a context clip comprising context information wherein said master clip further comprises a second insertion point and wherein said computer is further configured to combine said context clip with said master clip at said second insertion point with undetectable transitions at said second insertion point.

22. The apparatus of claim 21 wherein said process is further configured to create said output clip via seamless splicing at said first and said second insertion points.

23. The apparatus of claim 21 wherein said context information specifies the timing of a dispatch of said output clip.

24. The apparatus of claim 21 wherein said context information is utilized in determining a delivery mechanism.

25. The apparatus of claim 21 wherein said context information is utilized in determining a destination media player type.

26. The apparatus of claim 21 wherein said context information is utilized in determining when to avoid dispatching said output media clip.

27. The apparatus of claim 21 wherein said context information comprises time information.

28. The apparatus of claim 21 wherein said context information comprises calendar information.

29. The apparatus of claim 21 wherein said context information comprises location information.

30. The apparatus of claim 21 wherein said insert clip, said master clip and said context clip comprise a celebrity voice.

31. The apparatus of claim 21 wherein said insert clip, said master clip and said context clip further comprise metadata.

32. The apparatus of claim 31 wherein said metadata further comprises classification data.

33. The apparatus of claim 31 wherein said metadata further comprises identification data.

34. The apparatus of claim 31 wherein said metadata further comprises a variable name.

35. The apparatus of claim 21 further comprising a network capable playback device.

36. The apparatus of claim 35 wherein said playback device comprises a browser.

37. The apparatus of claim 35 wherein said playback device comprises a PDA.

38. The apparatus of claim 35 wherein said playback device comprises a phone.

39. The apparatus of claim 35 wherein said playback device is configured to ring with a personalized ring media clip.

40. The apparatus of claim 39 wherein said personalized ring media clip uses a celebrity voice.

41. The apparatus of claim 38 wherein said phone is configured to send a personalized media clip to a group of users.

42. The apparatus of claim 35 wherein said playback device identifies a user via RFID.

43. The apparatus of claim 35 wherein said playback device comprises a credit card reader and said playback device identifies a user via a credit card.

44. The apparatus of claim 35 wherein said playback device is an ATM machine.

45. The apparatus of claim 35 wherein said playback device is a GPS enabled device.

46. The apparatus of claim 35 wherein said playback device is a slot machine.

47. The apparatus of claim 35 wherein said playback device is a loyalty card reader.

48. The apparatus of claim 35 wherein said playback device is a kiosk.

49. The apparatus of claim 35 wherein said playback device is a toy.

50. The apparatus of claim 49 wherein said toy is modified at a factory.

51. The apparatus of claim 49 wherein said toy is modified outside of a factory.

52. The apparatus of claim 35 wherein said playback device is a digital cable set-top box.

53. The apparatus of claim 35 wherein said playback device is an hotel electronic door.

54. A method comprising:
recording a master clip;
recording a plurality of insert clips;
encoding an insert clip selected from said plurality of insert clips into insert clip packets:
encoding said master clip into master clip packets wherein said insert clip packets and said master clip packets are encoded into a degraded frequency response compressed format wherein each packet selected from said insert clip rackets and from said master clip packets holds information only for a time duration of each respective packet;
saving metadata for said master clip wherein said metadata comprises an insertion point in said master clip: and,
combining said insert clip with said master clip at said insertion point to create an output clip with undetectable transitions at said insertion point.

55. The method of claim 54 wherein said metadata comprises a variable name.

56. The method of claim 54 further comprising:
identifying a user by an identifier.

57. The method of claim 56 further comprising:
identifying context information for said user.

58. The method of claim 57 further comprising:
recording a context clip.

59. The method of claim 58 further comprising:
encoding said context clip into context clip packets wherein said context clip packets are encoded into a degraded frequency response compressed format wherein each packet selected from said context clip packets holds information only for a time duration of each respective packet; and,
combining said context clip with said master clip at a context insertion point to create an output clip with undetectable transitions at said context insertion point.

60. The method of claim 56 further comprising:
obtaining delivery mechanism information.

61. The method of claim 56 further comprising:
obtaining destination media player configuration.

62. The method of claim 56 further comprising:
accessing a database.

63. The method of claim 56 further comprising:
delivering an output clip.

64. The method of claim 63 wherein delivering comprises alerting a user to incoming mail.

65. The method of claim 63 further comprising:
streaming the media clip to a media player.

66. The method of claim 63 wherein said delivering further comprises dialing a phone.

67. The method of claim 56 further comprising:
branching in order to select an alternate clip based on said identifier.

68. The method of claim 56 further comprising:
branching in order to select an alternate clip based on said context information.

* * * * *